United States Patent
Lair et al.

(10) Patent No.: US 7,735,778 B2
(45) Date of Patent: Jun. 15, 2010

(54) PIVOTING FAIRINGS FOR A THRUST REVERSER

(75) Inventors: Jean-Pierre Lair, San Antonio, TX (US); Paul Weaver, Chateauguay (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 29 days.

(21) Appl. No.: 11/941,395

(22) Filed: Nov. 16, 2007

(65) Prior Publication Data

US 2009/0127391 A1   May 21, 2009

(51) Int. Cl.
*F02K 1/54* (2006.01)
(52) U.S. Cl. .............. 244/110 B; 60/226.2; 60/229; 60/230; 239/265.19; 239/265.29
(58) Field of Classification Search ............. 244/110 B; 60/229, 230, 226.2; 239/265.19, 265.29
See application file for complete search history.

(56) References Cited

U.S. PATENT DOCUMENTS

| | | | | |
|---|---|---|---|---|
| 2,847,823 A | * | 8/1958 | Brewer | 239/265.29 |
| 3,347,578 A | | 10/1967 | Sheehan et al. | |
| 3,492,821 A | * | 2/1970 | Monaghan et al. | 60/229 |
| 3,541,794 A | | 11/1970 | Johnston et al. | |
| 3,550,855 A | * | 12/1970 | Buell et al. | 239/265.29 |
| 3,610,534 A | | 10/1971 | Medawar | |
| 3,640,468 A | | 2/1972 | Searle et al. | |
| 3,660,982 A | | 5/1972 | Gozlan | |
| 3,684,182 A | * | 8/1972 | Maison | 239/265.19 |
| 3,856,239 A | * | 12/1974 | Leibach | 244/12.5 |
| 4,047,381 A | | 9/1977 | Smith | |
| 4,129,269 A | * | 12/1978 | Fage | 244/110 B |
| 4,175,385 A | | 11/1979 | Nash | |
| 4,182,501 A | * | 1/1980 | Fage | 244/110 B |
| 4,212,442 A | * | 7/1980 | Fage | 244/110 B |
| 4,232,516 A | | 11/1980 | Lewis et al. | |
| 4,292,803 A | * | 10/1981 | Prior | 60/230 |
| 4,362,015 A | * | 12/1982 | Fage | 60/226.2 |
| 4,422,605 A | * | 12/1983 | Fage | 244/110 B |
| 4,424,669 A | | 1/1984 | Fage | |
| 4,519,561 A | * | 5/1985 | Timms | 244/110 B |

(Continued)

FOREIGN PATENT DOCUMENTS

FR    2601077    1/1988

(Continued)

OTHER PUBLICATIONS

Merriam-Webster Online Dictionary <http://www.merriam-webster.com/dictionary/fairing[2]>.*

(Continued)

*Primary Examiner*—Michael R Mansen
*Assistant Examiner*—Justin Benedik
(74) *Attorney, Agent, or Firm*—Bachman & LaPointe, P.C.

(57) ABSTRACT

The thrust reverser is used with a gas turbine engine and includes first and second doors pivotable between a stowed position and a deployed position. When deployed, pivoting fairings on the first door are moved so as to give room to the second door as its trailing edge moves within the first door. When stowed, the second door preferably provides the locking mechanism to the pivoting fairings of the first door.

20 Claims, 7 Drawing Sheets

U.S. PATENT DOCUMENTS

| | | | |
|---|---|---|---|
| 4,581,890 A * | 4/1986 | Giraud | 60/230 |
| 4,682,733 A | 7/1987 | Newton | |
| 4,801,112 A | 1/1989 | Fournier | |
| 4,830,519 A | 5/1989 | Starke | |
| 4,836,451 A | 6/1989 | Herrick et al. | |
| 4,860,956 A * | 8/1989 | Fage | 239/265.19 |
| 4,865,256 A | 9/1989 | Durand | |
| 4,894,985 A | 1/1990 | Dubois | |
| 4,909,346 A | 3/1990 | Torkelson | |
| 4,914,905 A | 4/1990 | Dubois | |
| 4,916,895 A | 4/1990 | Dubois | |
| 4,922,712 A | 5/1990 | Matta | |
| 4,922,713 A | 5/1990 | Barbarin | |
| 4,960,243 A | 10/1990 | Dubois | |
| 4,966,327 A | 10/1990 | Fage et al. | |
| 4,976,466 A | 12/1990 | Vauchel | |
| 4,998,409 A | 3/1991 | Mutch | |
| 5,003,770 A | 4/1991 | Schegerin | |
| 5,039,171 A | 8/1991 | Lore | |
| 5,040,730 A | 8/1991 | Hogie | |
| 5,083,426 A | 1/1992 | Layland | |
| 5,090,197 A | 2/1992 | Dubois | |
| 5,097,661 A * | 3/1992 | Lair et al. | 60/226.2 |
| 5,101,621 A | 4/1992 | Mutch | |
| 5,117,630 A | 6/1992 | Cariola | |
| 5,120,004 A | 6/1992 | Matthias | |
| 5,167,118 A | 12/1992 | Torkelson | |
| 5,176,340 A * | 1/1993 | Lair | 244/110 B |
| 5,181,676 A | 1/1993 | Lair | |
| 5,192,023 A | 3/1993 | Fage et al. | |
| 5,197,693 A | 3/1993 | Remlaoui | |
| 5,203,525 A | 4/1993 | Remlaoui | |
| 5,209,057 A | 5/1993 | Remlaoui | |
| 5,211,008 A | 5/1993 | Fage | |
| 5,221,048 A | 6/1993 | Lair | |
| 5,224,342 A | 7/1993 | Lair | |
| 5,228,641 A | 7/1993 | Remlaoui | |
| 5,230,213 A * | 7/1993 | Lawson | 60/226.2 |
| 5,243,817 A | 9/1993 | Matthias | |
| 5,251,435 A | 10/1993 | Pauley | |
| 5,267,438 A | 12/1993 | Bunel | |
| 5,284,015 A | 2/1994 | Carimali | |
| 5,297,387 A | 3/1994 | Carimali | |
| 5,309,711 A * | 5/1994 | Matthias | 60/226.2 |
| 5,310,117 A | 5/1994 | Fage et al. | |
| 5,347,808 A | 9/1994 | Standish | |
| 5,372,006 A * | 12/1994 | Lair | 60/226.2 |
| 5,390,879 A | 2/1995 | Lair | |
| 5,392,991 A * | 2/1995 | Gatti et al. | 239/265.29 |
| 5,396,762 A * | 3/1995 | Standish | 60/226.2 |
| 5,419,515 A | 5/1995 | Lair | |
| 5,440,875 A | 8/1995 | Torkelson | |
| 5,473,886 A * | 12/1995 | Lebrun et al. | 60/230 |
| 5,524,431 A | 6/1996 | Brusson | |
| 5,548,954 A | 8/1996 | de Cambray | |
| 5,558,594 A | 9/1996 | Lefranc | |
| 5,615,549 A | 4/1997 | Valleroy | |
| 5,615,834 A * | 4/1997 | Osman | 239/265.19 |
| 5,655,360 A | 8/1997 | Butler | |
| 5,666,802 A | 9/1997 | Lair | |
| 5,671,598 A * | 9/1997 | Standish | 60/226.2 |
| 5,716,025 A | 2/1998 | Meyer | |
| 5,720,449 A | 2/1998 | Laboure | |
| 5,725,182 A | 3/1998 | Valleroy | |
| 5,727,380 A | 3/1998 | Lardy et al. | |
| 5,730,392 A | 3/1998 | Lair | |
| 5,765,362 A | 6/1998 | Gonidec | |
| 5,775,097 A | 7/1998 | Lardy | |
| 5,775,639 A | 7/1998 | Fage | |
| 5,778,659 A | 7/1998 | Duesler | |
| 5,778,660 A | 7/1998 | Jean | |
| 5,779,192 A * | 7/1998 | Metezeau et al. | 244/110 B |
| 5,782,434 A | 7/1998 | Jean | |
| 5,785,249 A | 7/1998 | Metezeau | |
| 5,794,433 A * | 8/1998 | Peters et al. | 60/226.2 |
| 5,799,903 A | 9/1998 | Vauchel | |
| 5,806,302 A | 9/1998 | Cariola | |
| 5,813,220 A | 9/1998 | Portal | |
| 5,819,527 A | 10/1998 | Fournier | |
| 5,819,528 A | 10/1998 | Masson | |
| 5,826,823 A * | 10/1998 | Lymons et al. | 244/110 B |
| 5,836,149 A * | 11/1998 | Servanty | 60/226.2 |
| 5,852,928 A | 12/1998 | Vauchel | |
| 5,853,148 A | 12/1998 | Standish | |
| 5,863,014 A | 1/1999 | Standish | |
| 5,875,995 A | 3/1999 | Moe | |
| 5,893,265 A | 4/1999 | Gonidec | |
| 5,899,059 A | 5/1999 | Gonidec | |
| 5,904,041 A | 5/1999 | Dhainault | |
| 5,913,476 A | 6/1999 | Gonidec | |
| 5,927,647 A | 7/1999 | Masters | |
| 5,930,991 A | 8/1999 | Fournier | |
| 5,934,613 A | 8/1999 | Standish | |
| 5,937,636 A * | 8/1999 | Gonidec et al. | 60/226.2 |
| 5,947,625 A | 9/1999 | Vauchel | |
| 5,956,939 A | 9/1999 | Fage | |
| 5,960,626 A | 10/1999 | Baudu | |
| 5,967,460 A | 10/1999 | Baudu | |
| 5,970,704 A | 10/1999 | Lardy | |
| 5,974,783 A | 11/1999 | Gonidec | |
| 5,983,625 A | 11/1999 | Gonidec | |
| 5,987,881 A | 11/1999 | Gonidec | |
| 5,996,937 A | 12/1999 | Gonidec | |
| 5,997,054 A | 12/1999 | Baudu | |
| 6,000,216 A | 12/1999 | Vauchel | |
| 6,009,702 A | 1/2000 | Gonidec | |
| 6,026,638 A | 2/2000 | Gonidec | |
| 6,027,071 A | 2/2000 | Lair | |
| 6,029,439 A | 2/2000 | Gonidec | |
| 6,032,901 A | 3/2000 | Carimali | |
| 6,044,641 A | 4/2000 | Baudu | |
| 6,045,091 A | 4/2000 | Baudu | |
| 6,065,285 A | 5/2000 | Gonidec | |
| 6,068,213 A | 5/2000 | Gonidec | |
| 6,076,347 A | 6/2000 | Gonidec | |
| 6,079,201 A | 6/2000 | Jean | |
| 6,082,096 A | 7/2000 | Vauchel | |
| 6,094,908 A | 8/2000 | Baudu | |
| 6,101,807 A | 8/2000 | Gonidec | |
| 6,105,439 A | 8/2000 | Roger | |
| 6,145,301 A | 11/2000 | Gonidec | |
| 6,145,786 A | 11/2000 | Baudu | |
| 6,148,607 A | 11/2000 | Baudu | |
| 6,151,884 A | 11/2000 | Gonidec | |
| 6,151,885 A | 11/2000 | Metezeau | |
| 6,151,886 A | 11/2000 | Vauchel | |
| 6,158,211 A | 12/2000 | Gonidec | |
| 6,170,254 B1 | 1/2001 | Cariola | |
| 6,170,255 B1 | 1/2001 | Gonidec | |
| 6,173,807 B1 | 1/2001 | Welch et al. | |
| 6,216,980 B1 | 4/2001 | Baudu | |
| 6,237,325 B1 | 5/2001 | Hogie | |
| 6,256,979 B1 * | 7/2001 | Fournier et al. | 60/226.2 |
| 6,260,801 B1 | 7/2001 | Peters | |
| 6,276,026 B1 | 8/2001 | Wille | |
| 6,293,495 B1 | 9/2001 | Aten | |
| 6,357,672 B1 | 3/2002 | Cowan et al. | |
| 6,385,964 B2 | 5/2002 | Jean | |
| 6,402,092 B1 | 6/2002 | Jean | |
| 6,438,942 B2 | 8/2002 | Fournier | |
| 6,487,845 B1 * | 12/2002 | Modglin et al. | 60/226.2 |
| 6,546,715 B1 | 4/2003 | Blevins | |
| 6,546,716 B2 | 4/2003 | Lair | |
| 6,568,172 B2 | 5/2003 | Jannetta et al. | |

| | | |
|---|---|---|
| 6,584,763 B2 | 7/2003 | Lymons |
| 6,592,074 B2 | 7/2003 | Dehu |
| 6,622,964 B2 | 9/2003 | Rouyer |
| 6,688,098 B2 | 2/2004 | Rouyer |
| 6,688,099 B2 * | 2/2004 | Lair .................. 60/226.2 |
| 6,751,944 B2 | 6/2004 | Lair |
| 6,786,038 B2 | 9/2004 | Lair |
| 6,804,947 B2 | 10/2004 | Le Docte |
| 6,820,410 B2 | 11/2004 | Lair |
| 6,845,607 B2 | 1/2005 | Lair |
| 6,845,945 B1 * | 1/2005 | Smith .................. 244/110 B |
| 6,845,946 B2 | 1/2005 | Lair |
| 6,895,742 B2 | 5/2005 | Lair et al. |
| 6,910,328 B1 | 6/2005 | Joyce |
| 6,926,234 B2 | 8/2005 | Colotte |
| 6,938,408 B2 | 9/2005 | Lair |
| 6,945,031 B2 | 9/2005 | Lair |
| 6,966,175 B2 | 11/2005 | Lair |
| 6,968,675 B2 | 11/2005 | Ramlaoui et al. |
| 6,971,229 B2 | 12/2005 | Lair |
| 6,976,352 B2 * | 12/2005 | Lair .................. 60/226.2 |
| 6,983,588 B2 | 1/2006 | Lair |
| 6,993,819 B2 | 2/2006 | Homann |
| 7,007,454 B2 | 3/2006 | Dehu |
| 7,010,905 B2 | 3/2006 | Lair |
| 7,043,897 B2 | 5/2006 | Osman |
| 7,055,329 B2 | 6/2006 | Martens et al. |
| 7,093,793 B2 | 8/2006 | Lair |
| 7,104,500 B1 * | 9/2006 | Smith .................. 244/110 B |
| 7,127,880 B2 | 10/2006 | Lair |
| 7,146,796 B2 * | 12/2006 | Lair .................. 60/226.2 |
| 7,229,247 B2 | 6/2007 | Durocher et al. |
| 7,255,307 B2 | 8/2007 | Mayes |
| RE039,972 E | 1/2008 | Royalty |
| 2004/0139726 A1 | 7/2004 | Colotte et al. |
| 2005/0151012 A1 | 7/2005 | Lair |
| 2005/0183894 A1 | 8/2005 | Lair |
| 2006/0005530 A1 | 1/2006 | Blin |
| 2006/0288688 A1 | 12/2006 | Lair |
| 2008/0072570 A1 * | 3/2008 | Lair .................. 60/226.2 |

FOREIGN PATENT DOCUMENTS

WO    86/00862 A1    2/1986

OTHER PUBLICATIONS

U.S. Appl. No. 11/941,378, filed Nov. 16, 2007, entitled "Thrust Reverser for a Turbofan Gas Turbine Engine", by Jean-Pierre Lair.

U.S. Appl. No. 11/941,360, filed Nov. 16, 2007, entitled "Thrust Reverser Door", by Jean-Pierre Lair.

U.S. Appl. No. 11/941,371, filed Nov. 16, 2007, entitled "Pivoting Door Thrust Reverser for a Turbofan Gas Turbine Engine", by Jean-Pierre Lair.

U.S. Appl. No. 11/941,391, filed Nov. 16, 2007, entitled "Thrust Reverser Door", by Jean-Pierre Lair.

U.S. Appl. No. 11/941,388, filed Nov. 16, 2007, entitled "Thrust Reverser", by Jean-Pierre Lair.

U.S. Appl. No. 12/142,084, filed Jun. 19, 2008, entitled "Thrust Reverser for a Turbofan Gas Turbine Engine", by Jean-Pierre Lair and Paul Weaver.

* cited by examiner

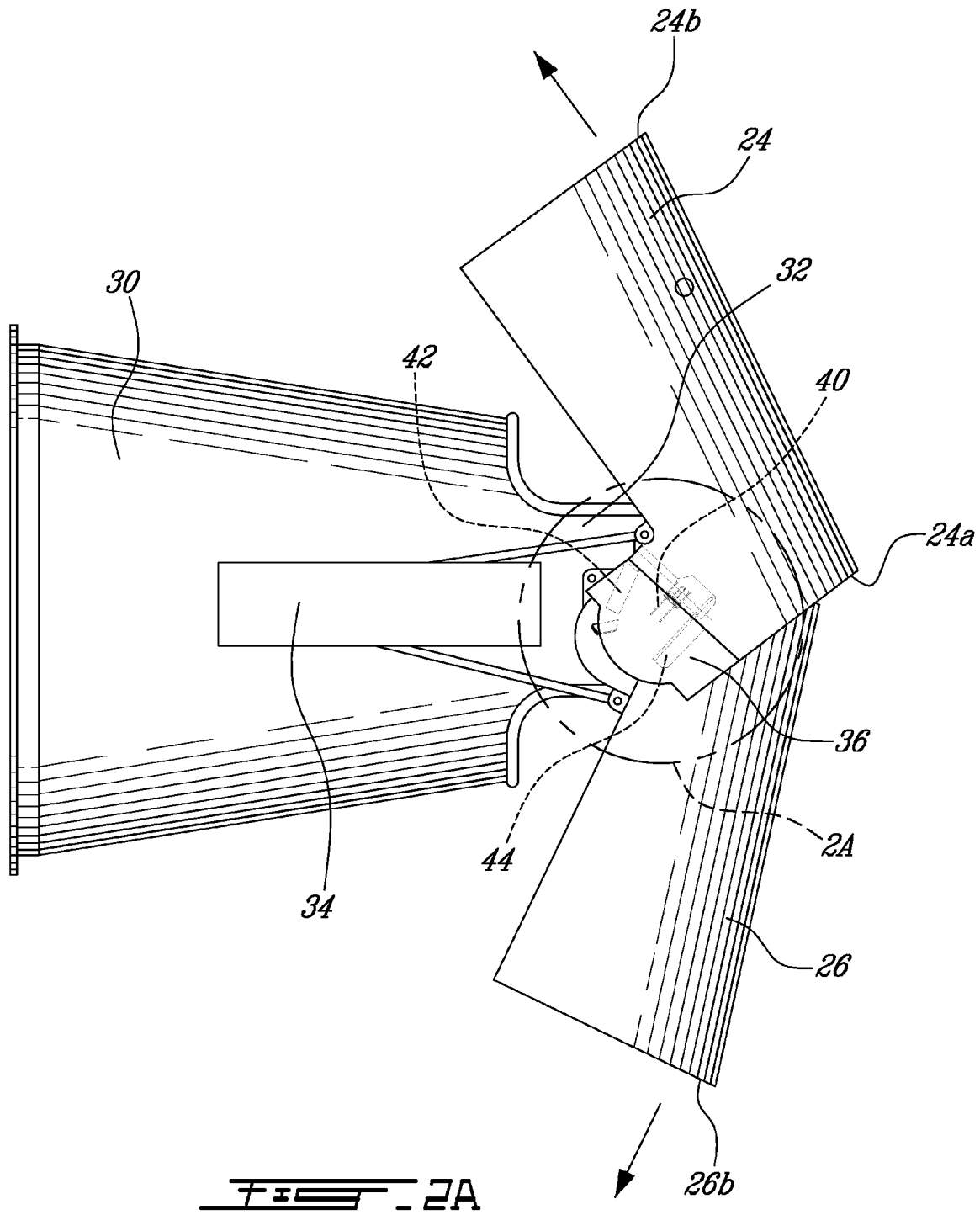

PIVOTING FAIRINGS FOR A THRUST REVERSER

TECHNICAL FIELD

The invention relates to thrust reversers for gas turbine engines.

BACKGROUND

Thrust reversers on gas turbine engines have to fulfill two functions: while stowed, to provide an exhaust nozzle for the direct thrust generated by the engine; and while deployed, to redirect the engine thrust in order to provide a decelerating force after landing. Since almost the entire flight sequence occurs with the thrust reverser in the stowed position, it is desirable that the presence of the thrust reverser does not degrade the direct thrust performance of the engine.

While many thrust reverser models have been used successfully for a number of years, there is always a need to provide further improved arrangements.

SUMMARY

In one aspect, the present concept provides a thrust reverser for a nacelle of a gas turbine engine, the thrust reverser comprising a first reverser door and a second reverser door defining a portion of an aft section of the nacelle, the doors having a respective trailing edge adjacent to a propulsive jet outlet of the nacelle and being pivotable simultaneously between a stowed position and a deployed position, the trailing edge of the first door being positioned behind the trailing edge of the second door in the deployed position, the thrust reverser comprising a pair of pivoting fairings, each having a respective trailing edge adjacent to the propulsive jet outlet and being pivotally connected to a respective side of the first door, the pivoting fairings being in a stowed position when the doors are in a stowed position and being in an outwardly pivoted position when the doors are in a deployed position.

In another aspect, the present concept provides a fairing for a thrust reverser door, the fairing comprising a wall defining an outer surface and being pivotable around a pivot axis located adjacent to an edge of the wall, the wall being pivotally connected to a side at a rear end of a door, the wall being outwardly biased around the pivot axis.

In another aspect, the present concept provides method of pivoting doors of a thrust reverser, the method comprising the simultaneous steps of: pivoting the doors from a stowed position to a deployed position in such a way that a trailing edge of a first one of the doors moves behind the trailing edge of a second one of the doors; and outwardly pivoting a pair of opposite fairings that are connected to corresponding sides of the first door and adjacent to its trailing edge so as to provide clearance for the trailing edge of the second door in the deployed position.

Further details of these and other aspects of the improvements presented herein will be apparent from the detailed description and appended figures.

BRIEF DESCRIPTION OF THE FIGURES

FIG. 2A is a schematic view showing an example of the present thrust reverser doors in a deployed position around a jet pipe.

DETAILED DESCRIPTION

Figure 1:
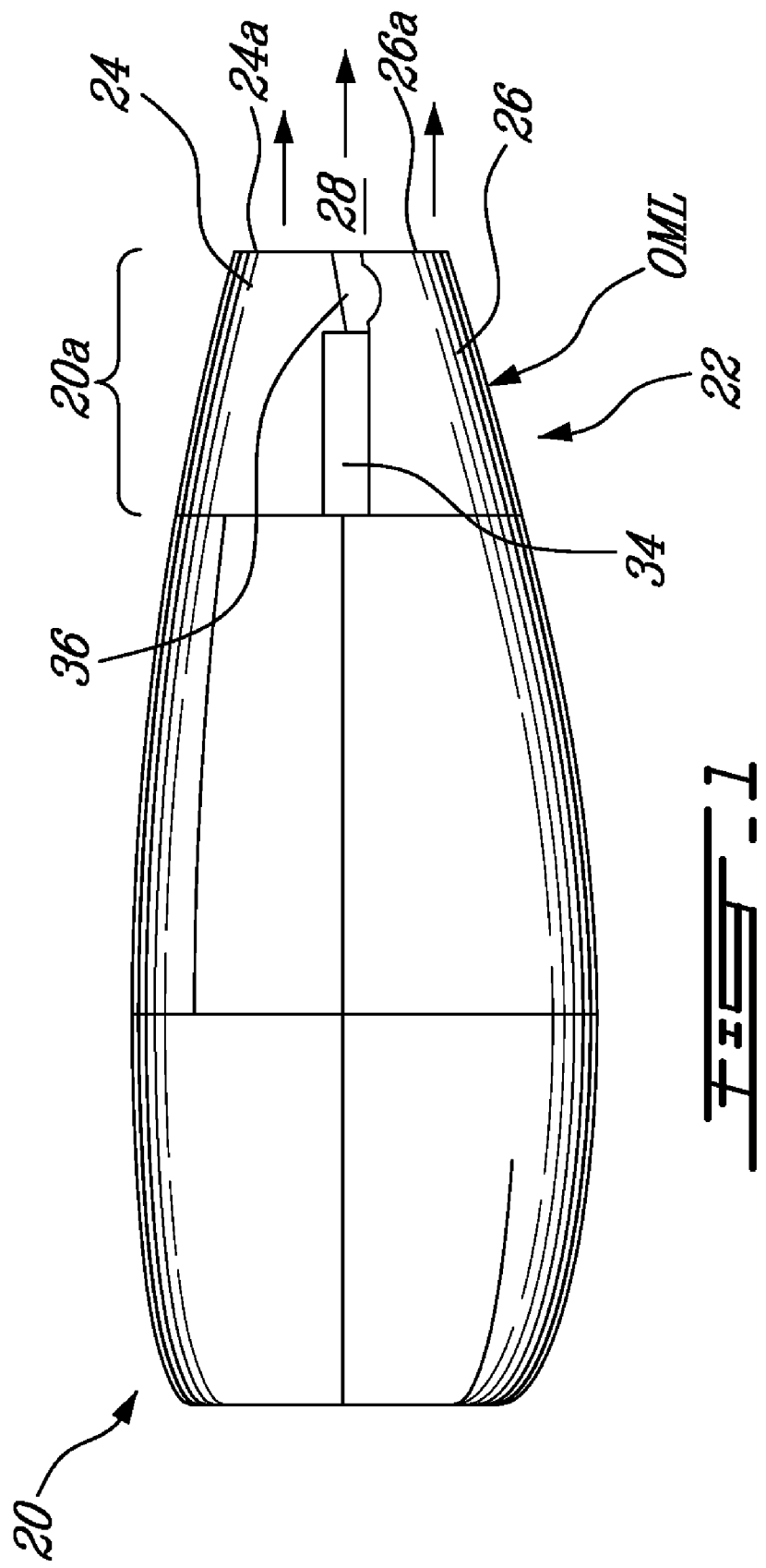
FIG. 1 is a side view of an example of a nacelle provided with a thrust reverser, its doors being shown in a stowed position.

Referring to FIG. 1, there is shown an example of a nacelle 20 including a target/bucket door type thrust reverser 22 in the aft section 20*a* of the nacelle 20. The turbofan gas turbine engine is located within the nacelle 20 and the nacelle 20 is attached under the wings or on the fuselage of the aircraft using an appropriate arrangement (not shown). The thrust reverser 22 comprises two opposite pivoting doors 24, 26 forming most of the propulsive jet outlet 28 of the nacelle 20 when they are in a stowed position. One door 24 of the illustrated example is at the upper side and the other door 26 is at the bottom side. The doors 24, 26 are generally semi-circular.

Figure 2B:
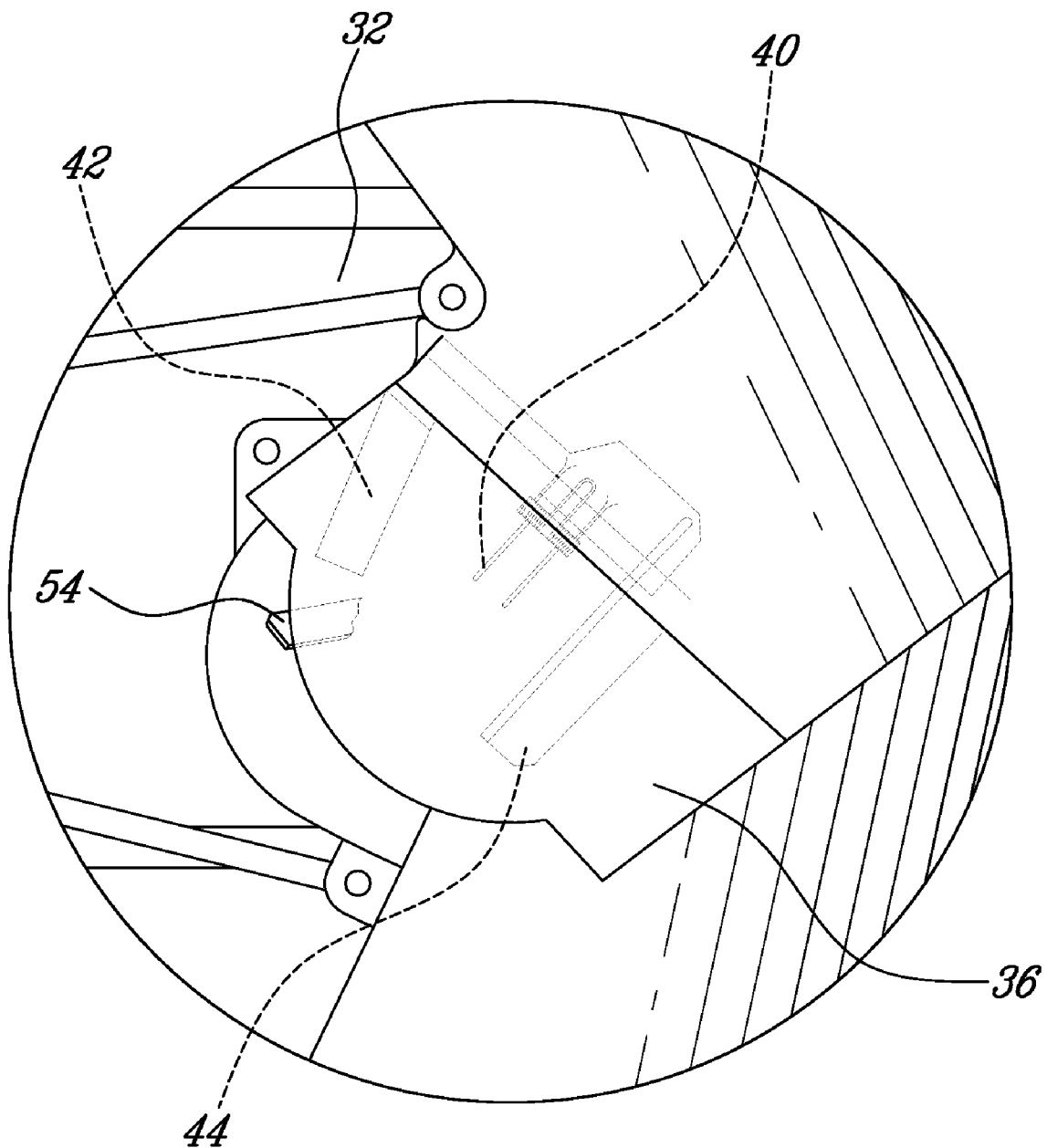
FIG. 2B is an enlarged view of the indicated portion of FIG. 2A.

Each door 24, 26 has a trailing edge 24*a*, 26*a* adjacent to the propulsive jet outlet 28. The arrows in FIG. 1 show the direct thrust operation of the engine. The thrust reverser nozzle 22 is active in direct thrust as it forms the exhaust nozzle of the engine. The trailing edges 24*a*, 26*a* cooperate with the trailing edge of side arms 32 of a jet pipe 30 (FIG. 2A) located inside the aft section 20*a* of the nacelle 20 and to which the doors 24, 26 are pivotally connected. The leading edges 24*b*, 26*b* of the doors 24, 26 and their outer wall form a smooth continuity with the upstream parts of the nacelle 20 when the doors 24, 26 are in the closed position.

FIG. 2A schematically shows an example of the interior side of the fixed structure 30 of the thrust reverser 22. The jet pipe 30 and its side arms 32 are concealed inside the aft section 20*a* of nacelle 20 when the doors 24, 26 are in their stowed position, as in FIG. 1.

The engine is in a thrust reversal mode in FIG. 2A. This mode is generally used immediately after landing an aircraft on a runway. The doors 24, 26 are pivoted to that position simultaneously using actuators (not shown). The arrows in FIG. 2A indicate the main flow path of the efflux coming out of the engine when operated during the thrust reversal. As can be seen, a large portion of the gases coming out of the engine are deviated substantially toward the front. The gases exit the doors 24, 26 in the vicinity of their leading edges 24*b*, 26*b*. These edges are located at the front of the doors 24, 26 and are referred to as "leading" edges with reference to the travel path of the aircraft. The deviation of the gases creates a resulting horizontal retarding force opposing the forward movement of the aircraft. Increasing the output thrust generated by the engine creates an increased aerodynamic decelerating force, thus more braking.

Figure 3:
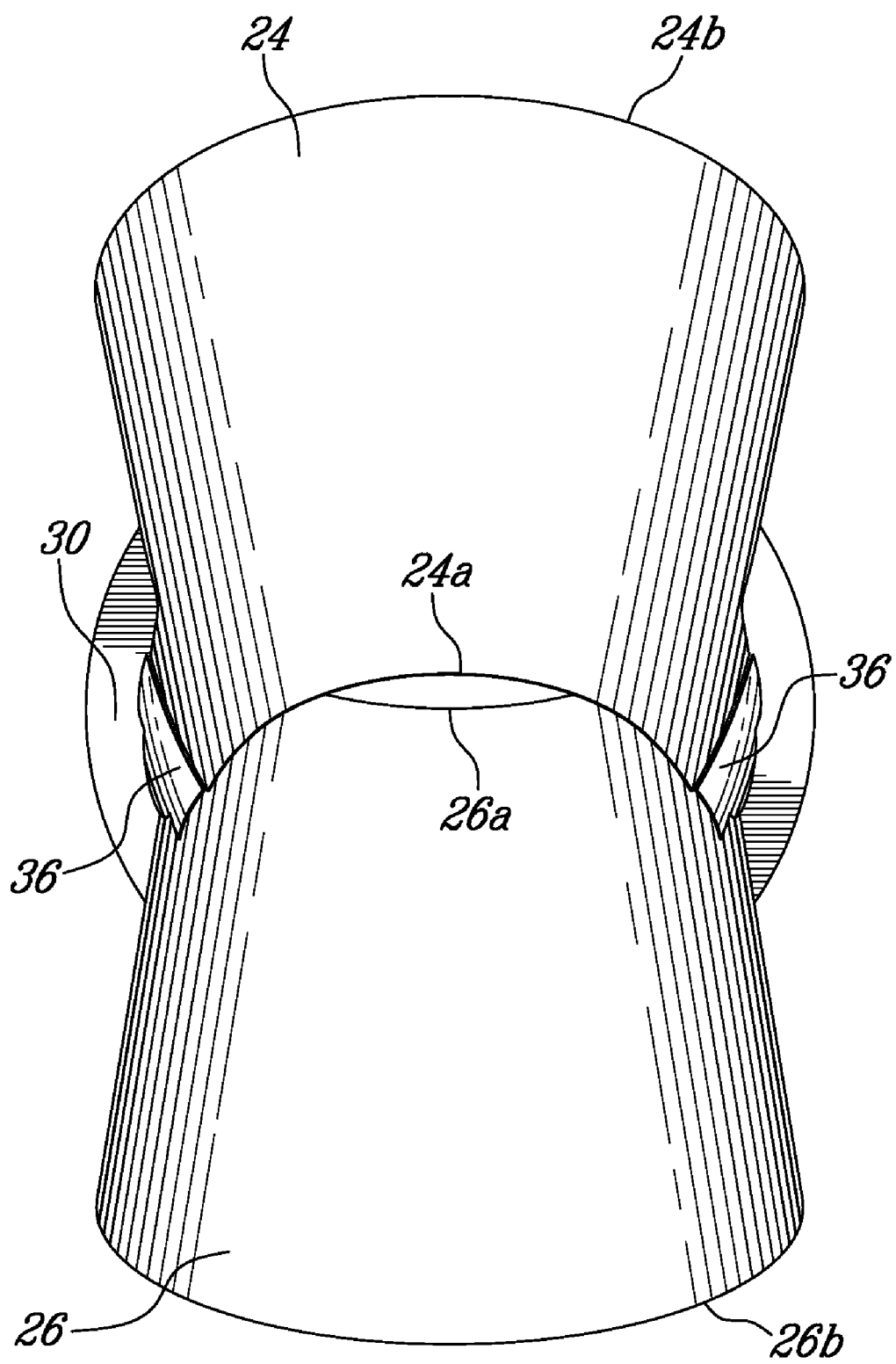
FIG. 3 is a rear view of the trust reverser doors shown in FIG. 2A.

FIGS. 2A and 3 show that the trailing edge 24*a* of the upper door 24 is pivoted behind the trailing edge 24*a* of the lower door 26 when the doors 24, 26 are deployed. This can result from the asymmetrical positioning of the door's pivots with reference to the horizontal center plane of the jet pipe 30 as disclosed, for instance, in applicant's co-pending application Ser. No. 11/534,202, filed Sep. 21, 2006. FIG. 3 shows the deployed doors of FIG. 2 from the rear.

As can be seen in FIG. 1, the doors 24, 26 are separated on each side by longitudinal fairings 34, 36. The fairings 34, 36 cover the actuators, the various linkages and other parts in that area. They complete the outer mold line (OML) of the nacelle 20 when the doors 24, 26 are stowed. The front fairings 34 are fixed and the rear fairings 36 are pivotable. The pivoting fairings 36 have trailing edges 36a that meet the trailing edge of the jet pipe 30 for minimization of the base area. The trailing edges 36a of the pivoting fairings 36 also form a substantially continuous outline with the trailing edges 24a, 26a of the doors 24, 26, which outline surrounds the propulsive jet outlet 28.

Figure 4:
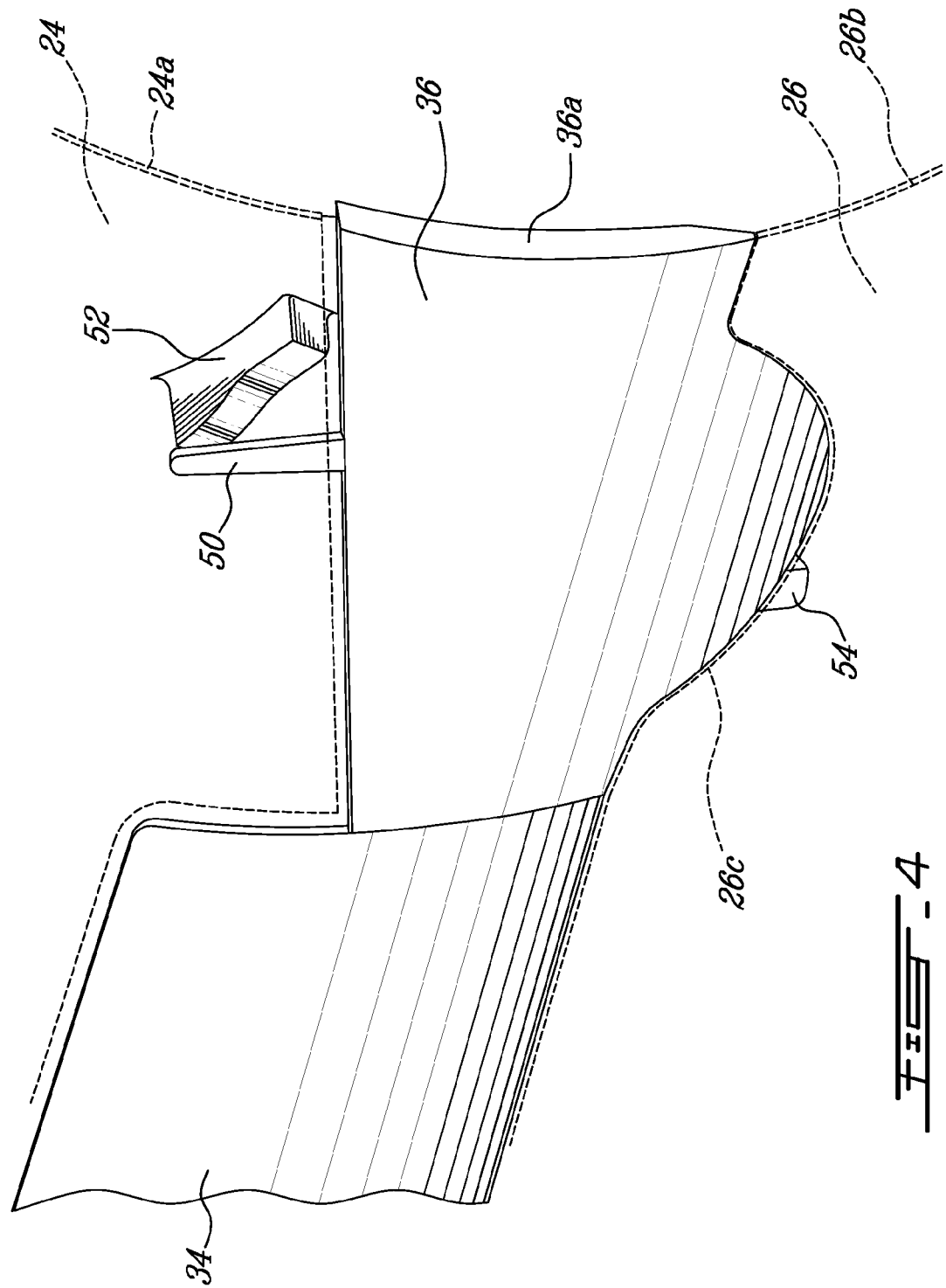
FIG. 4 is a schematic and enlarged view showing one of the pivoting fairings at the rear side of the upper thrust reverser door of FIG. 2A, both doors being shown as transparent.
Figure 5:
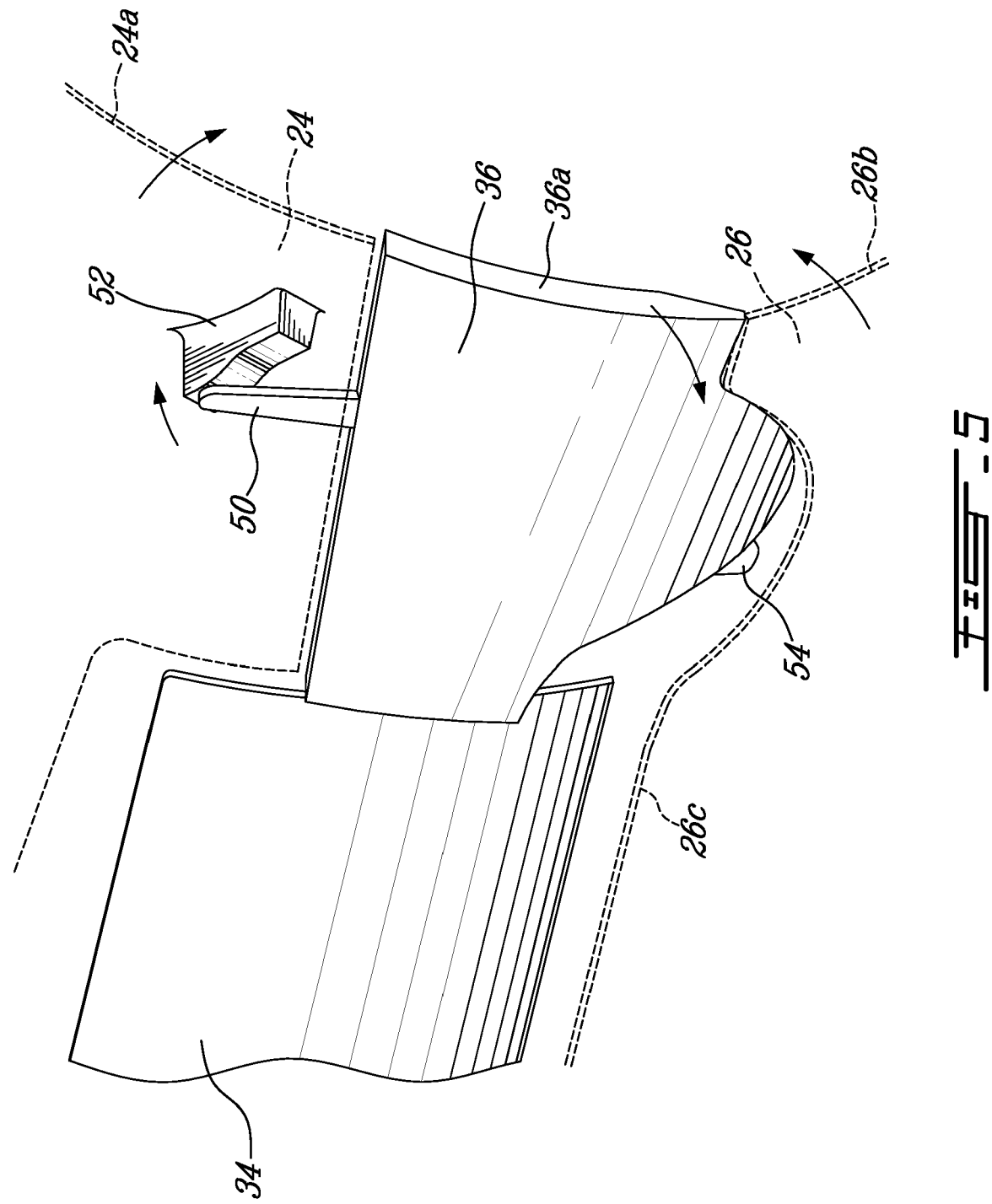
FIG. 5 is a view similar to FIG. 4, showing the pivoting fairing at the beginning of the deployment of the doors.
Figure 6:
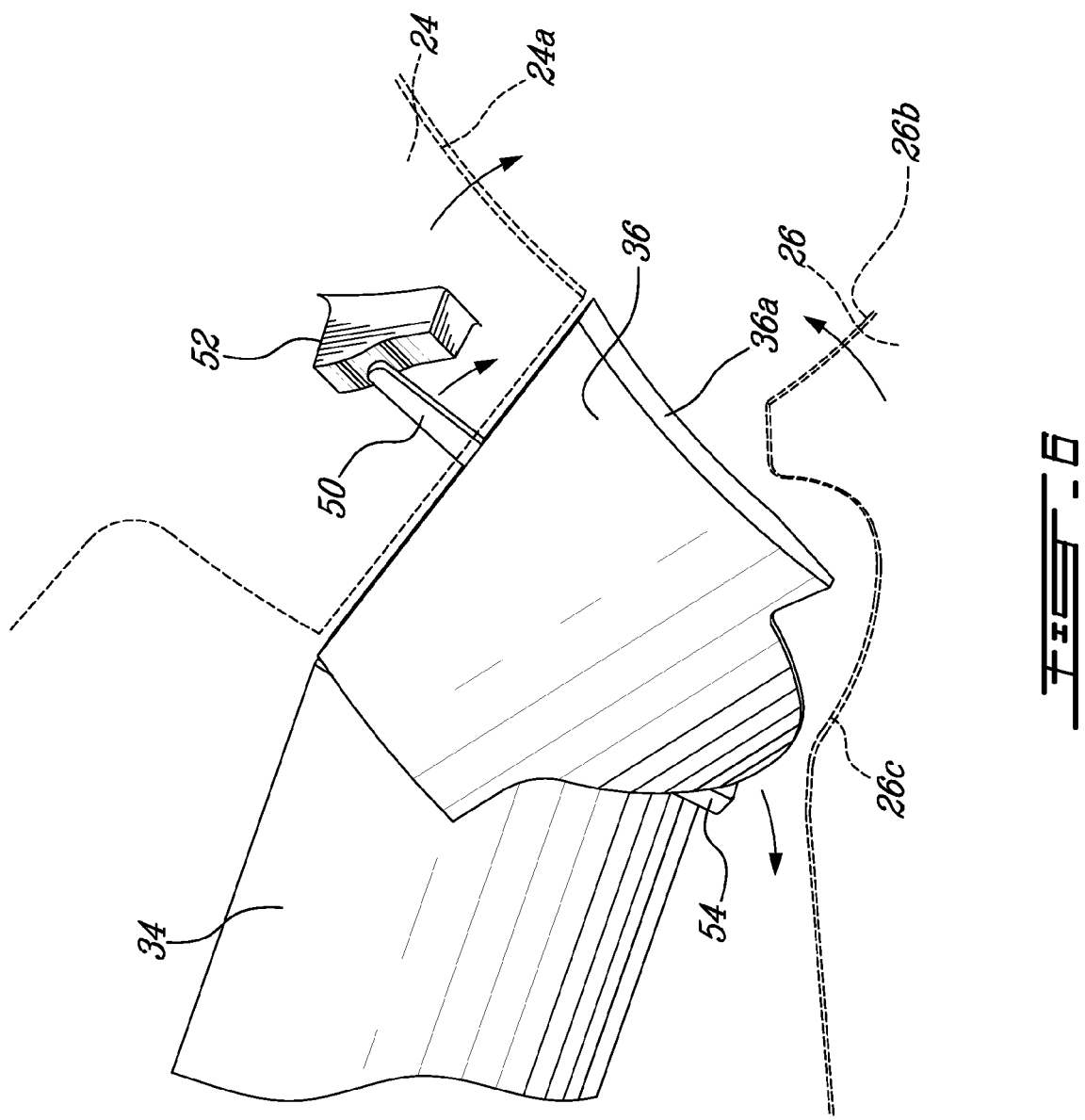
FIG. 6 is a view similar to FIGS. 4 and 5, showing the doors during the transit to their deployed position, the pivoting fairing being pivoted further outwards.

There are two pivoting fairings 36 on the thrust reverser 22. One is inboard and the other is outboard. They are preferably mirror images of each other. The pivoting fairings 36 provide clearance for the ends of the trailing edge of the door that goes into the other door when they are deployed. This way, in the case of the illustrated example, the trailing edge 26a of the lower door 26 can move into the upper door 24 without interference. FIGS. 4 to 6 illustrate various stages of the movement of one of the pivoting fairings 36. The other parts are not shown in these figures for the sake of clarity.

The pivoting fairing 36 is outwardly biased to its opened position and is pivotally connected at the rear of the upper door 24. A torsion spring 40, shown in FIG. 2B, can be used to generate the bias. Other kinds of springs or arrangements are possible. The upper door 24 supports the spring 40 and devises (not shown) on which is hinged the pivoting fairing 36. There are two supporting devises per pivoting fairing 36 and each fairing 36 is fitted with two associated hinges 42, 44, one located upstream the other one downstream of the fairing 36.

As shown in FIG. 4, the pivot axis of the pivoting fairing 36 of the illustrated embodiment defines an angle with reference to the central longitudinal axis of the nacelle 20. The exact shape of the wall of the pivoting fairing 36 depends on the width required for the clearance of the lower door 26 in the deployed position.

The hinge 44 located downstream is fitted with a follower arm 50 that can be on or off an inclined ramp 52 installed on the outer surface of a fixed structure, in this case the jet pipe arm 32 of the jet pipe 30. The illustrated pivoting fairing 36 is also fitted with a locking tab 54 that engages the surface under the upper longitudinal edge 26c of the lower door 26 for locking the pivoting fairing 36 in a stowed position when the doors 24, 26 are stowed. The lower door 26 is consequently part of the locking mechanism of the pivoting fairing 36.

FIG. 4 shows the doors 24, 26 immediately before moving from their stowed position to their deployed position. The pivoting fairing 36 is urged to outwardly pivot around its own pivot axis under the action of its spring 40. However, the pivoting fairing 36 is retained by its locking tab 54 that has not yet disengaged from the upper longitudinal edge 26c the of lower door 26. FIG. 4 also shows that the arm 50 of the pivoting fairing 36 is above but not yet engaged on the ramp 52 of the jet pipe 30.

FIG. 5 shows the doors 24, 26 when in transit to their deployed position, and the locking tab 54 of the pivoting fairing 36 is now disengaged from the lower door 26 while the arm 50 is now engaging the ramp 52 on the jet pipe 30. Since the pivoting fairing 36 is spring loaded to its opened position and the spring 40 maintains the arm 50 in contact with the inclined surface of the ramp 52 that is fixed, the pivot angle of the fairing 36 is dictated by the relative position of the arm 50 on the ramp 52. The ramp 52 has a decreasing height toward the rear and accordingly, the pivot angle of the fairing 36 increases as the doors 24, 26 move closer to their deployed position.

FIG. 6 shows that the doors 24, 26 are continuing their movement toward the deployed position, and the arm 50 is still resting on the ramp 52 but will eventually leave the ramp 52 at one point. A stop or another means can be provided to maintain the same pivot angle when the arm 50 leaves the ramp 52. The trailing edge at the end of the ramp 52 can otherwise be inclined for redirecting the arm 50 on its surface when the doors 24, 26 are moved back to the stowed position.

It should be noted that the same figures can be used for explaining how the pivoting fairing 36 moves back to its locking position and is locked once again by the lower door 26. As the doors 24, 26 move from their deployed to their stowed positions, the pivoting fairing 36 stays opened until the arm 50 meets and rests on the ramp 52 of the jet pipe 30, as in FIG. 6. As the doors 24, 26 continue to transit toward their stowed position, the ramp 52 of the jet pipe 30 forces the pivoting fairing 36 to return progressively towards its stowed position, as in FIG. 5. At one point, the locking tab 54 of the pivoting fairing 36 engages the surface underneath the lower door 26 while the arm 50 of the pivoting fairing 36 moves off the ramp 52 but stays above it, as in FIG. 4. From this position to the fully stowed position of the doors 24, 26, the lower door 26, via the locking tab 54 of the pivoting fairing 36, drives it to its fully stowed position. Locking the pivoting fairing 36 using the lower door 26 prevents it from fluttering during direct thrust.

The above description is meant to be exemplary only, and one skilled in the art will recognize that many changes may also be made to the embodiments described without departing from the inventions disclosed. For instance, the exact shape of the illustrated elements (nacelle, doors, etc.) may be different. Although the doors are described herein and shown in the figures as being an upper reverser door and a lower reverser door movable in a vertical plane, doors can also be configured as left and rights door movable in a horizontal plane. Likewise, the skilled reader will appreciate that it is possible to provide an arrangement in which the trailing edge of the lower door opens behind the trailing edge of the front door, as mentioned above, and other arrangements of the trailing edges are also available. Other door arrangements employing the present invention are possible, as well, and therefore this description is not to be understood as limited to the door mounting orientation and configuration depicted, nor the target/bucket type depicted. The pivoting fairings can be attached to the lower door instead of the upper door in a thrust reverser designed so that the upper door goes into the lower door. Other locking mechanisms can be devised than the one shown and described herein. Still other modifications which fall within the scope of the present invention will be apparent to those skilled in the art, in light of a review of this disclosure, and such modifications are intended to fall within the appended claims.

What is claimed is:

1. A thrust reverser for a nacelle of a gas turbine engine having an axis, the thrust reverser comprising a first reverser door and a second reverser door defining a portion of an aft section of the nacelle, the doors having respective trailing edges adjacent to a propulsive jet outlet of the nacelle and being pivotable simultaneously between a stowed position and a deployed position, the trailing edge of the first door being positioned behind the trailing edge of the second door in the deployed position, the thrust reverser including a pair of pivoting fairings, one fairing disposed on either side of the nacelle, the fairings disposed and extending between the doors when the doors are in the stowed position, each fairing having a respective trailing edge adjacent to the propulsive jet outlet and being pivotally connected to an axially-extending side edge of the first door, the pivoting fairings being in a stowed position when the doors are in a stowed position, and the pivoting fairings pivoting about an axis substantially parallel to the first door side edge to an outwardly pivoted position when the doors are in a deployed position.

2. The thrust reverser as defined in claim 1, wherein the first door is an upper door and the second door is a lower door.

3. The thrust reverser as defined in claim 1, wherein the trailing edges of the pivoting fairings have a substantially semi-cylindrical shape.

4. The thrust reverser as defined in claim 1, wherein the pivoting fairings are outwardly biased.

5. The thrust reverser as defined in claim 4, wherein each pivoting fairing is outwardly biased by at least one torsion spring.

6. The thrust reverser as defined in claim 1, farther comprising a locking mechanism provided for each pivoting fairing and locking the corresponding pivoting fairing in its stowed position.

7. The thrust reverser as defined in claim 6, wherein each locking mechanism includes a tab projecting from an edge of the pivoting fairing and which is held under an adjacent longitudinal side edge of the second door when the pivoting fairings and the doors are in their stowed position.

8. The thrust reverser as defined in claim 1, wherein the pivoting fairings have an angular position between their stowed position and their outwardly pivoted position that depends upon an angular position of the first door over at least a portion of a range of angular positions of the first door.

9. The thrust reverser as defined in claim 8, wherein the angular position of the pivoting fairings is at least partially dependent upon a relative position of a follower arm along an inclined ramp provided on a fixed structure.

10. The thrust reverser as defined in claim 9, wherein the fixed structure is a jet pipe to which the doors are pivotally connected.

11. A thrust reverser comprising at least two thrust reverser doors and a fairing extending between the doors when the thrust reverser doors are in a closed position, the fairing having a wall defining an outer surface and being pivotable around a pivot axis located adjacent to an edge of the wall, the wall being pivotally connected to a longitudinally-extending side edge of a said door, the pivot axis substantially parallel to said side edge, the wall being outwardly biased around the pivot axis.

12. The fairing as defined in claim 11, wherein the wall has a trailing edge having a substantially semi-cylindrical shape.

13. The fairing as defined in claim 11, further comprising at least one torsion spring provided between the door and the wall.

14. The fairing as defined in claim 11, further comprising means for locking the wall in a stowed position.

15. The fairing as defined in claim 14, wherein the means for locking comprises a tab projecting from an edge of the wall and opposite the pivot axis.

16. The fairing as defined in claim 11, wherein the wall outwardly pivots around the pivot axis when the doors are in the deployed position and has a pivot angle depending at least partially on a pivot angle of the door.

17. The fairing as defined in claim 16, wherein the pivot angle of the wall is set by a follower arm attached to the wall and engaged on a fixed inclined ramp.

18. The fairing as defined in claim 17, wherein the fixed inclined ramp is attached to a jet pipe arm.

19. A method of pivoting doors of a thrust reverser, the method comprising the simultaneous steps of:
  pivoting the doors from a stowed position to a deployed position in such a way that a trailing edge of a first one of the doors moves behind the trailing edge of a second one of the doors; and
  outwardly pivoting a pair of opposite fairings about respective pivot axes which are substantially parallel to longitudinally-extending edges defining corresponding sides of the first door and adjacent to its trailing edge so as to provide clearance for the trailing edge of the second door in the deployed position.

20. The method as defined in claim 19, further comprising the step of locking the fairings when the doors are in their stowed position using the second door.

* * * * *